May 19, 1936.  E. L. WICKS  2,041,629
AUTOMATIC WEIGHING MACHINE
Filed Oct. 24, 1934  2 Sheets-Sheet 1
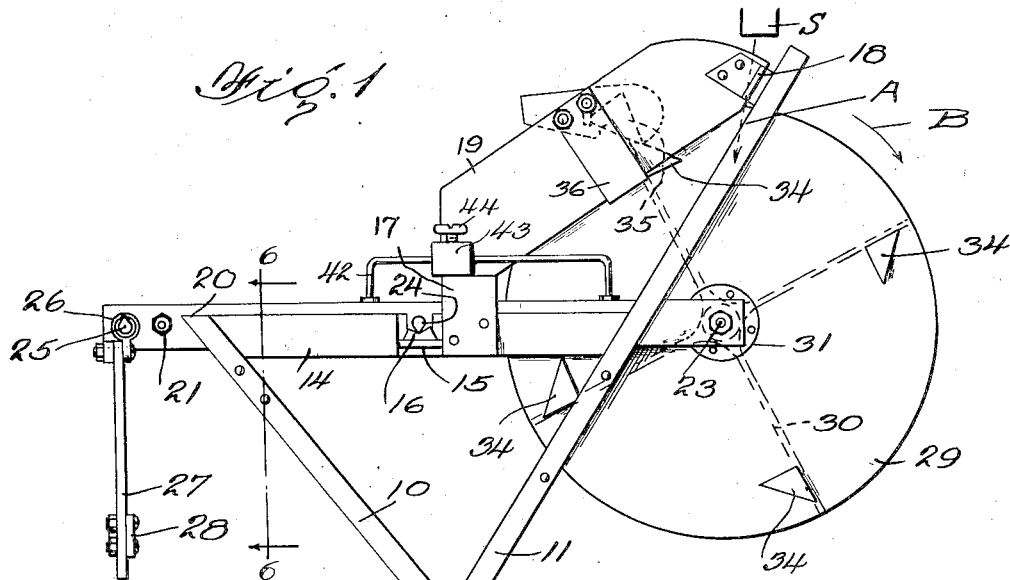
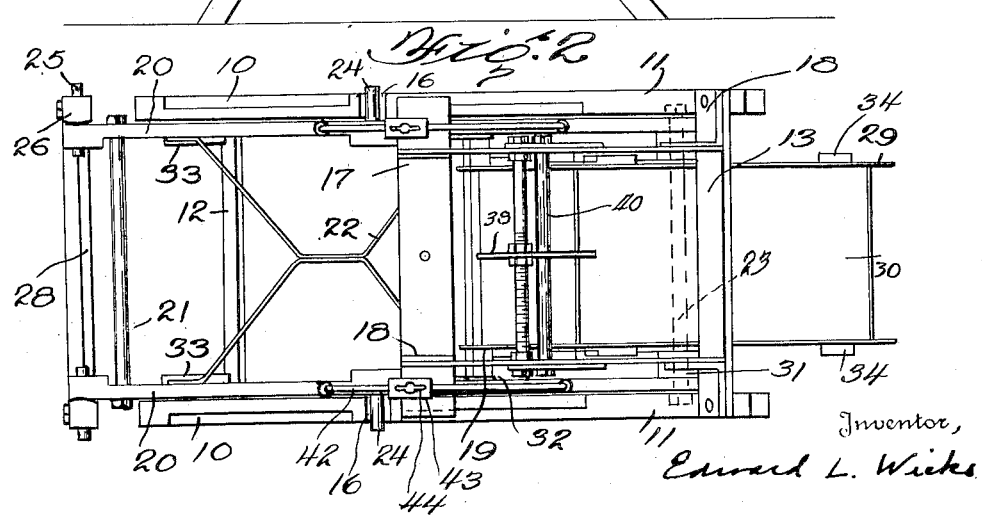
Inventor,
Edward L. Wicks
By Ivan P. Tashof
Attorney

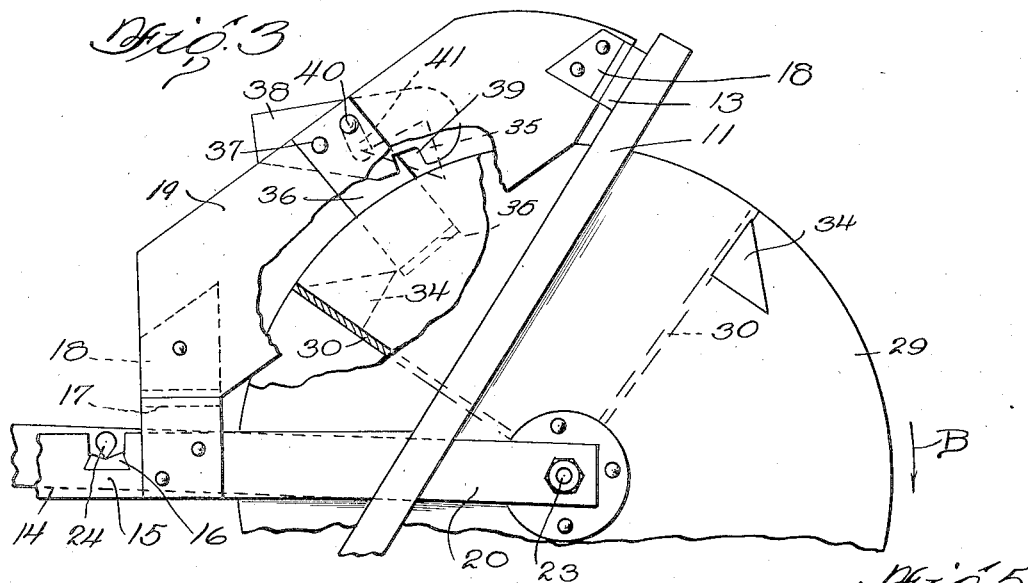
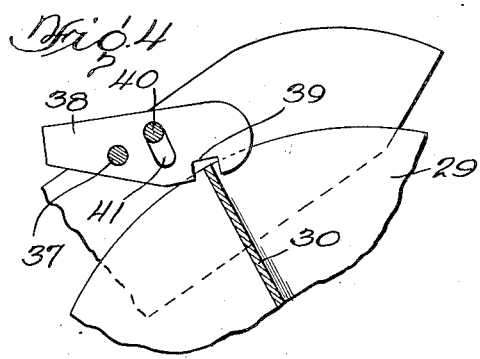
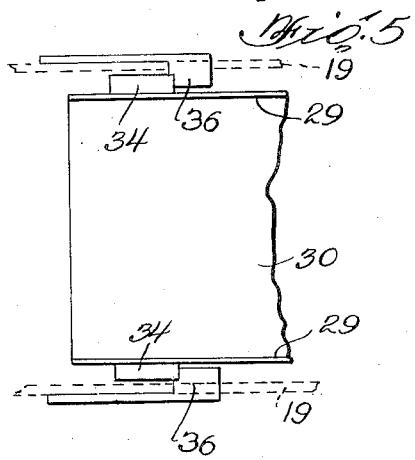
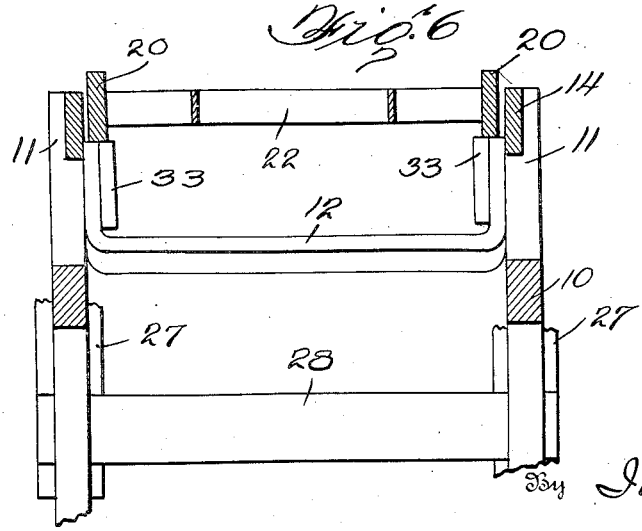

Patented May 19, 1936

2,041,629

UNITED STATES PATENT OFFICE 2,041,629

AUTOMATIC WEIGHING MACHINE

Edward L. Wicks, New Orleans, La.

Application October 24, 1934, Serial No. 749,805

3 Claims. (Cl. 249—19)

This invention relates to automatic weighing machines and has special reference to a machine of this character including a rotary material receiving drum.

One important object of the invention is to provide an improved device of this character whereby great uniformity in successive weighings is attained.

A second important object of the invention is to provide a novel machine of this character wherein a rotary weighing drum is restricted from oscillatory movement by novel means.

A third important object of the invention is to provide an improved weighing machine of this character wherein the weighing drum is mechanically forced back to material receiving position after each weighing of a quantity of material.

With the above and other objects in view, the invention consists in general of certain novel details of construction and combinations of parts hereinafter fully described, illustrated in the accompanying drawings, and specifically claimed.

In the accompanying drawings like characters of reference indicate like parts in the several views, and:—

Figure 1 is a side elevation of the invention;

Fig. 2 is a top plan view thereof;

Fig. 3 is an enlarged detail section showing the arrangement for returning the weighing drum to its normal raised position;

Fig. 4 is a detail view showing the means for preventing vibration of the drum;

Fig. 5 is a plan view of certain parts and showing means for lifting the drum after its load is discharged.

Fig. 6 is an enlarged detail on the line 6—6 of Fig. 1.

In the embodiment of the invention here shown the machine is disclosed as provided with spaced pairs of crossed legs 10 and 11 of which 11 may be called the front legs, and these front legs project considerably higher than the rear legs 10. The upper parts of the legs 10 are connected by a cross bar 12 while the upper ends of the legs 11 are similarly connected by a cross bar or brace 13. Extending horizontally between the top of each leg 10 and the leg 11 on the same side of the machine is a bar 14 and each bar is provided, intermediate the legs 10 and 11, with a notch 15 wherein is seated a case-hardened fulcrum block 16. Between these notches and the legs 11 the longitudinal members 14 are connected by a cross member 17 and on this cross member and the cross bar 13 are mounted brackets 18 which support side pieces or checks 19 which are spaced inwardly of the side frames formed by the legs and the longitudinal members 14.

The weighing lever frame consists of a pair of side members or levers 20 which are held in spaced relation at their rear ends by a tie rod 21 and between their ends by bracing 22. The front ends of these members are also connected by a shaft 23. Each lever 20 is provided with a knife edged fulcrum piece 24 which rests on a respective block 16. Thus this lever frame is tiltably mounted on the main frame. Projecting from the rear end of each lever is a knife-edge member 25 which enters a yoke 26 from which depends a hanger 27. The lower ends of these hangers are connected by a weight bar 28 adapted to accommodate weights of the usual slotted type common to weighing scales.

Mounted on the shaft 23 is a drum having circular ends 29 connected by partitions 30, the ends being provided with ball bearings 31 fitting the shaft so that the drum is very freely rotatable on the shaft. This drum is divided by the partitions into a number of segmento-cylindrical weighing compartments, and it will now be observed that if material is poured in that compartment which happens to be uppermost in a sufficient quantity, while the drum is held against rotation, the front end of the lever frame will move downwardly. In order to limit movement of the lever frame there are provided front stops 32 and rear stops 33.

In order to prevent rotation of the drum during the filling operation one end 29 of the drum has fixed thereto bevelled stops 34 corresponding in number to the number of partitions employed, as here shown four of each. Also on the corresponding frame check 19 is a fixed bevelled stop 35 so positioned and arranged that when the front end of the lever frame is in its raised position the bevelled face of the stop 35 is engaged by a stop 34 whereby further rotation of the drum is prevented. Extending from each of the checks is a bracket 36 which is so positioned that rotation of the drum brings the forward edge of each stop 34 just above the rear edge of the bracket 36 so that the stop 34 rides over the bracket 36 and lifts the front end of the lever frame thus causing the stop 34 to be raised into position to engage the stop 35.

In order to prevent vibration of the drum after its motion is checked by the coaction of the stops 34 and 35, the checks 19 are connected by a tie bar 37 on the middle of which is pivoted a latch 38 having a notch 39 in its lower edge. This notch engages a partition 30 upon the lug or stop 34 corresponding to that partition engaging the stop 35. In order to limit the action of the latch a second tie rod 40 extends between the checks 19 and passes through a slot 41 in said latch. Thus the latch is held from binding on the partition 30 and free movement of the lever frame is permitted.

In operation the material to be weighed flows down through a spout S in the direction of the arrow A until the proper weight of material has accumulated in the compartment positioned to receive such material. When this weight of material has been deposited in the compartment, the front end of the lever frame drops. This releases the drum which rotates in the direction of the arrow B to dump the received material and, after dumping, the rotation of the drum brings an empty compartment beneath the spout S. As the drum rotates, one pair of the stops 34 engages the fixed members 36 and, due to the angularity of this engagement as seen in Figure 3, the drum is raised. At the same time, the engagement of the parts 34 and 36 checks the rotary movement of the drum so that the free edge of the partition 30 which engages the latch 38 will effect such engagement in a gentle manner. When the latch 38 is thus engaged it will rise until the notch 39 can receive the edge of the partition 30 and will then drop back to hold the drum from rotation in either direction until the drum is loaded and moves downward. If provision was not made for checking the rotation of the drum, the latch might be engaged with sufficient force to throw it up long enough for the partition 30 to pass the notch 38 and thus produce inaccurate weighing of the next batch delivered to the drum. In this manner each successive compartment is filled and emptied.

In order to arrange for accurate balance under loading conditions and to prevent light weighing under the influence of the impact of material on the drum, there is provided a bar 42 on at least one lever 20 which carries a sliding counterweight 43 held in adjusted position by a thumb screw 44. This may, if desired, be duplicated on the opposite side bar 20. The utility of the parts just mentioned will be plain if it is considered that the material flows into the drum by gravity so that there is exerted on the drum a depressing force at any instance equal to the weight of material multiplied by the square of its velocity of fall from the delivery spout. Obviously then, the depressive force will be greater than the actual weight of material, and light weighing will occur unless means are provided to counteract the velocity function above noted, and it is for this reason that the counterweight 43 is provided.

It is to be observed that the oval construction of the bearing seats avoids friction; that there is a rapid braking action; that the drum rotates rapidly by the use of the ball bearings; that the construction does not require any flow cut-off connected to the working parts; that no plate to arrest flow of material to the compartments is necessary with this construction, and that the present scale may be used for grain, moisture bearing materials such as sugar, salts, superphosphates, potash, acid and free flowing liquids.

There has thus been provided a simple and efficient device of the kind described and for the purpose specified.

It is obvious that minor changes may be made in the form and construction of the invention without departing from the material principles involved.

It is not, therefore, desired to confine the invention to the exact form herein shown and described, but it is desired to include all forms within the scope of the appended claims.

What is claimed as new is:—

1. In an automatic weigher, a rotatable drum mounted for rising and falling movement, said drum including a pair of spaced heads and partitions extending between said heads, means constantly urging the drum to raised position, a series of wedge-like members carried by one of said heads and equal in number to the number of partitions, said wedge-like members being positioned to provide upper and lower working surfaces, said wedge-like members being fixed to the drum with their edge portions forward and their outer faces extending forwardly and inwardly of the drum from their rear base portions, a fixed drum checking and lifting member in the path of said wedge-like members and engageable by the lower working surfaces of the wedge-like members, as the drum is rotated under load influence, said checking and lifting member including a flat portion located to engage with its rear edge the under sides of the wedge-like members adjaent their edges, and a stop member fixedly positioned to engage the upper working surfaces of the wedge-like members as the latter pass out of engagement with the drum checking and lifting member, said stop member having a forwardly and downwardly inclined under surface corresponding in inclination to the upper surfaces of the wedge-like members whereby the wedge-like members are forced downwardly upon revolution of the drum.

2. In an automatic weigher, a rotatable drum mounted for rising and falling movement, said drum including a pair of spaced heads and partitions extending between said heads, means constantly urging the drum to raised position, a series of wedge-like members carried by one of said heads and equal in number to the number of partitions, said wedge-like members being positioned to provide upper and lower working surfaces, said wedge-like members being fixed to the drum with their edge portions forward and their outer faces extending forwardly and inwardly of the drum from their rear base portions, a fixed drum checking and lifting member in the path of said wedge-like members and engageable by the lower working surfaces of the wedge-like members as the drum is rotated under load influence, said checking and lifting member including a flat portion located to engage with its rear edge the under sides of the wedge-like members adjacent their edges, a stop member fixedly positioned to engage the upper working surfaces of the wedge-like members as the latter pass out of engagement with the drum checking and lifting member, said stop member having a forwardly and downwardly inclined under surface corresponding in inclination to the upper surfaces of the wedge-like members whereby the wedge-like members are forced downwardly upon revolution of the drum, and a latch member arranged to engage one of the partition edges upon rotary motion of the drum being stopped by engagement of a wedge-like member with the stop member.

3. In an automatic weigher, a rotatable drum mounted for rising and falling movement, said drum including a pair of spaced heads and partitions extending between said heads, means constantly urging the drum to raised position, a series of wedge-like members carried by one of said heads and equal in number to the number of partitions, said wedge-like members being positioned to provide upper and lower working surfaces, said wedge-like members being fixed to the drum with their edge portions forward and their outer faces extending forwardly and inwardly of the drum from their rear base portions, a fixed drum checking and lifting member in the path of said wedge-like members and engageable by the lower working surfaces of the wedge-like members as the drum is rotated under load influence, said checking and lifting member including a flat portion located to engage with its rear edge the under sides of the wedge-like members adjacent their edges, a stop member fixedly positioned to engage the upper working surfaces of the wedge-like members as the latter pass out of engagement with the drum checking and lifting member, said stop member having a forwardly and downwardly inclined under surface corresponding in inclination to the upper surfaces of the wedge-like members whereby the wedge-like members are forced downwardly upon revolution of the drum, and a latch member arranged to engage one of the partition edges upon rotary motion of the drum being stopped by engagement of a wedge-like member with the stop member, the partitions of the drum being arranged to be free from the latch upon depression of the drum and to engage the latch upon one of the wedge-like members engaging the drum checking and lifting member.

EDWARD L. WICKS.